United States Patent
Swain et al.

(10) Patent No.: US 12,443,875 B2
(45) Date of Patent: Oct. 14, 2025

(54) EXPLANATORY CONFUSION MATRICES FOR MACHINE LEARNING

(71) Applicant: International Business Machines Corporation, Armonk, NY (US)

(72) Inventors: Alex Swain, Cedar Park, TX (US); Stefan A. G. Van Der Stockt, Austin, TX (US); Edward James Biddle, Winchester (GB); Daniel Kuehn, Austin, TX (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 1039 days.

(21) Appl. No.: 17/093,978

(22) Filed: Nov. 10, 2020

(65) Prior Publication Data

US 2022/0147862 A1     May 12, 2022

(51) Int. Cl.
*G06N 20/20* (2019.01)
*G06F 18/40* (2023.01)
*G06N 5/01* (2023.01)
*G06N 5/04* (2023.01)
*G06N 20/00* (2019.01)

(52) U.S. Cl.
CPC ................. *G06N 20/00* (2019.01)

(58) Field of Classification Search
CPC .......... G06N 20/00; G06N 5/045; G06N 5/00; G06N 3/00
See application file for complete search history.

(56) References Cited

U.S. PATENT DOCUMENTS

| | | | |
|---|---|---|---|
| 8,611,675 B2* | 12/2013 | Chow | G06F 18/40 |
| | | | 382/104 |
| 10,354,205 B1 | 7/2019 | Pham | |
| 10,719,301 B1* | 7/2020 | Dasgupta | G06F 8/34 |
| 2008/0154807 A1* | 6/2008 | Chow | G06F 18/40 |
| | | | 706/12 |
| 2015/0254555 A1 | 9/2015 | Williams, Jr. | |
| 2020/0293940 A1* | 9/2020 | Chopra | G06F 8/34 |
| 2021/0256420 A1* | 8/2021 | Elisha | G06N 5/04 |

FOREIGN PATENT DOCUMENTS

CN     107229976 A     10/2017

OTHER PUBLICATIONS

Ashish Kapoor et al., "Interactive Optimization for Steering Machine Classification", Apr. 10, 2010 (Year: 2010).*

(Continued)

*Primary Examiner* — Brandon S Cole
(74) *Attorney, Agent, or Firm* — Rakesh Roy

(57) ABSTRACT

In an approach to creating explanatory confusion matrices, responsive to receiving a machine learning model for analysis, a confusion matrix is calculated for the machine learning model, where each cell in the confusion matrix has a corresponding set of data. A link is created from each cell in the confusion matrix to the corresponding set of data. Responsive to a user selecting in a user interface a specific cell of the confusion matrix, the corresponding set of data to the specific cell is displayed on the user interface.

9 Claims, 6 Drawing Sheets

(56) References Cited

OTHER PUBLICATIONS

Marco Tulio Ribeiro et al., "'Why Should I Trust You?' Explaining the Predictions of Any Classifier", Feb. 16, 2016 (Year: 2016).*
Anonymous et al., "A visual introduction to machine learning", R2D3, United States, Accessed on Jul. 31, 2020, 2 Pages.
Anonymous et al., "A visual introduction to machine learning—Part II, Model Tuning and the Bias-Variance Tradeoff", R2D3, United States, Accessed on Jul. 31, 2020, 1 Page.
Anonymous et al., "BLOKK is a font for quick mock-ups and wireframing for clients who do not understand latin", Blokk Font, Accessed on Jul. 31, 2020, 1 Page.
Anonymous et al., "Global Warming", Contropedia, Revision 893815787, Apr. 23, 2019, 22 Pages.
Anonymous et al., "Introducing the Create ML App", Apple Developer, WWDC, 2019, 2 Pages.
Anonymous et al., "Recognizing hand-written digits", Scikit-learn Developers, 2007-2009, 2 Pages.
Anonymous et al., "The Preservation of Favoured Traces", Fathom Information Design, Accessed on Jul. 31, 2020, 5 Pages.
Anonymous et al., "Visually probe the behavior of trained machine learning models, with minimal coding", What-If Tool, GitHub, Inc., Accessed on Jul. 31, 2020, 1 Page.
Anonymous et al., "Word-mesh", GitHub, Inc., Accessed on Jul. 31, 2020, 4 Pages.
Authors et. al. Disclosed Anonymously, "Automatic analysis and remediation of dynamic perturbations in resolver classes for retrospective learning and assignment of email tickets", An IP.com Prior Art Database Technical Disclosure, IP.com No. IPCOM000254356D, IP.com Electronic Publication Date: Jun. 22, 2018, 6 Pages.
Distill, Accessed on Jul. 31, 2020, 4 Pages.
Hu et al., "Method and System for Gender Classification of Names using Character Based Machine Learning Models", An IP.com Prior Art Database Technical Disclosure, IP.com No. IPCOM000259835D, IP.com Electronic Publication Date: Sep. 23, 2019, 3 Pages.
Kessler et al., "Scattertext 0.0.2.67", GitHub, Inc., Accessed on Jul. 31, 2020, 40 Pages.
Krause et al., "Using Visual Analytics to Interpret Predictive Machine Learning Models", 2016 ICML Workshop on Human Interpretability in Machine Learning (WHI 2016), New York, NY, USA, arXiv:1606.05685v2, [stat.ML], Jun. 21, 2016, 5 Pages.
Kukkar et al., "A Novel Deep-Learning-Based Bug Severity Classification Technique Using Convolutional Neural Networks and Random Forest with Boosting", Sensors 2019, 19, 2964; doi:10.3390/s19132964, Jul. 5, 2019, 22 Pages.
Lundberg et al., "SHAP (SHapley Additive exPlanations)", GitHub, Inc., Accessed on Jul. 31, 2020, 7 Pages.
Panickar et al., "Method and System for Classifying Large Data Using Machine Learning Algorithms", An IP.com Prior Art Database Technical Disclosure, IP.com No. IPCOM000233324D, IP.com Electronic Publication Date: Dec. 6, 2013, 5 Pages.
Posavec, Stefanie, "Writing Without Words", Accessed on Jul. 31, 2020, 1 Page.
Powell, Victor, "CSV Fingerprints", Setosa Blog, Aug. 3, 2014, 2 Pages.
Ribeiro, Marco Tulio Correia et al., "Lime", GitHub, Inc., Accessed on Jul. 31, 2020, 3 Pages.
Schapire, Rob, "Machine Learning Algorithms for Classification", Princeton University, United States, 2017, 92 Pages.
Turesson et al., "Machine Learning Algorithms for Automatic Classification of Marmoset Vocalizations", CrossMark, PLoS One 11(9):e0163041, doi:10.1371/journal.pone.0163041, Sep. 21, 2016, 14 Pages.
Yau, Nathan, "What Makes People the Most Happy", FlowingData, Jun. 21, 2018, 6 Pages.

* cited by examiner

PREDICTED LABELS

|   | 0 | 1 | 2 | 3 | 4 | 5 | 6 | 7 | 8 | 9 |
|---|---|---|---|---|---|---|---|---|---|---|
| 0 | 997 | 0 | 1 | 0 | 1 | 1 | 0 | 0 | 0 | 0 |
| 1 | 0 | 990 | 3 | 1 | 3 | 0 | 3 | 0 | 0 | 0 |
| 2 | 9 | 11 | 958 | 2 | 1 | 1 | 2 | 13 | 2 | 1 |
| 3 | 0 | 4 | 10 | 964 | 0 | 8 | 3 | 7 | 0 | 4 |
| 4 | 0 | 12 | 0 | 0 | 971 | 0 | 3 | 3 | 0 | 11 |
| 5 | 3 | 4 | 0 | 20 | 4 | 953 | 7 | 2 | 3 | 4 |
| 6 | 6 | 2 | 0 | 0 | 1 | 10 | 980 | 0 | 1 | 0 |
| 7 | 2 | 17 | 0 | 1 | 4 | 0 | 0 | 966 | 1 | 9 |
| 8 | 7 | 17 | 6 | 23 | 3 | 21 | 4 | 3 | 905 | 11 |
| 9 | 4 | 8 | 1 | 8 | 12 | 4 | 0 | 16 | 4 | 943 |

ACTUAL LABELS

FIG. 2

PREDICTED SENTIMENT

|  | NEGATIVE | NEUTRAL | POSITIVE |
|---|---|---|---|
| NEGATIVE | 99.1 | 0.9 | 0.0 |
| NEUTRAL | 0.0 | 99.0 | 1.0 |
| POSITIVE | 1.6 | 4.3 | 94.1 |

ACTUAL SENTIMENT

FIG. 3a

EXPLANATORY CONFUSION MATRICES FOR MACHINE LEARNING

BACKGROUND

The present invention relates generally to the field of machine learning, and more particularly to creating explanatory confusion matrices for machine learning.

Artificial intelligence (AI) can be defined as the theory and development of computer systems able to perform tasks that normally require human intelligence, such as speech recognition, visual perception, decision-making, and translation between languages. The term AI is often used to describe systems that mimic cognitive functions of the human mind, such as learning and problem solving.

Machine learning (ML) is an application of AI that creates systems that have the ability to automatically learn and improve from experience. Machine learning involves the development of computer programs that can access data and learn based on that data. Machine learning algorithms typically build mathematical models based on sample, or training, data in order to make predictions or decisions without being explicitly programmed to do so. Machine learning algorithms are used in a wide variety of applications, such as image analysis, speech recognition, classification, and medical applications.

A confusion matrix is a specific table layout that allows visualization of the performance of a machine learning algorithm. Each row of the matrix represents the instances in a predicted class while each column represents the instances in an actual class (or vice versa). The name stems from the fact that it makes it easy to see if the system is confusing two classes (i.e., commonly mislabeling one as another).

SUMMARY

Embodiments of the present invention disclose a method, a computer program product, and a system for creating explanatory confusion matrices for machine learning. In one embodiment, responsive to receiving a machine learning model for analysis, a confusion matrix is calculated for the machine learning model, where each cell in the confusion matrix has a corresponding set of data. A link is created from each cell in the confusion matrix to the corresponding set of data. Responsive to a user selecting in a user interface a specific cell of the confusion matrix, the corresponding set of data to the specific cell is displayed on the user interface.

BRIEF DESCRIPTION OF THE DRAWINGS

FIG. 2 depicts an example of a standard confusion matrix, in accordance with an embodiment of the present invention.

FIG. 3a is an example of a standard confusion matrix, as would be displayed by the current art, in accordance with an embodiment of the present invention.

DETAILED DESCRIPTION

Figure 1:
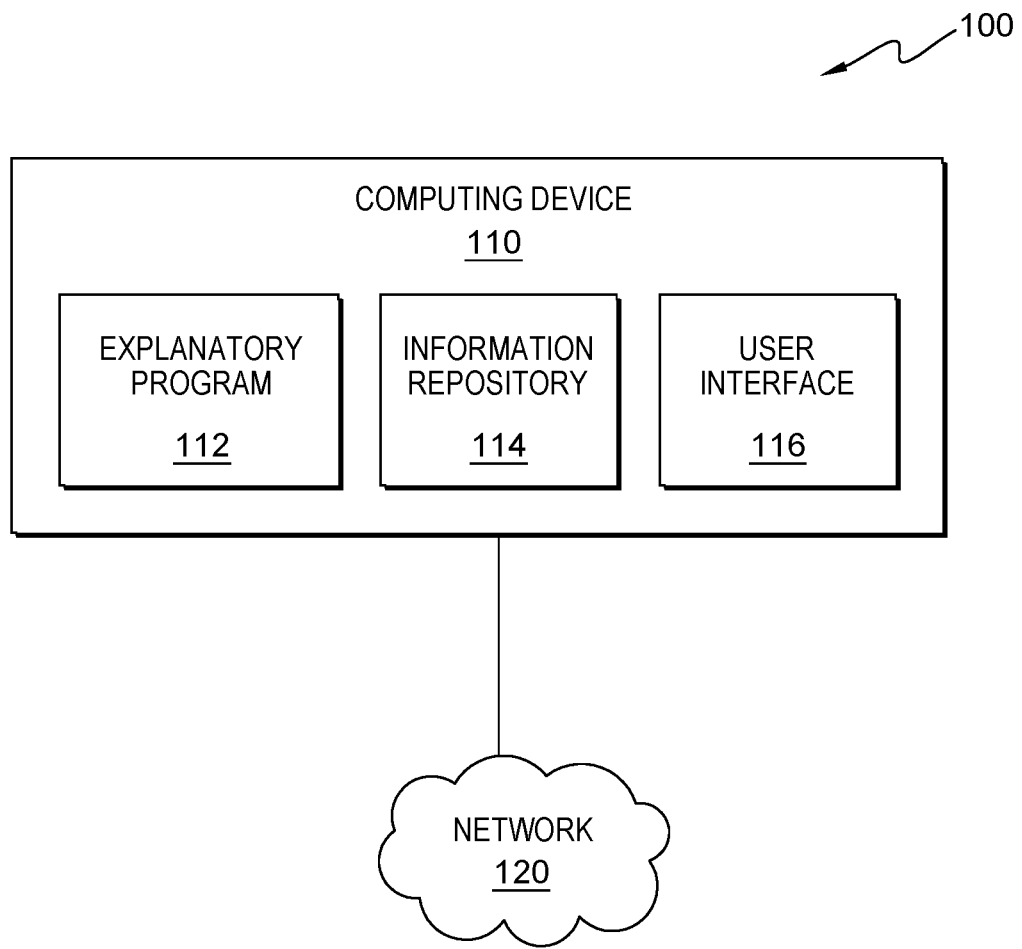
FIG. 1 is a functional block diagram illustrating a distributed data processing environment, in accordance with an embodiment of the present invention.

In machine learning, model accuracy is measured by how many data items are correctly classified against how many are falsely classified. These include true positives, where the class is correctly predicted and it is the positive class; true negatives, where the class is correctly predicted and it is the negative class; false positives, where the class is wrongly predicted as the positive class; and false negatives, where the class is wrongly predicted as the negative class.

One tool or method that helps visualize accuracy is a confusion matrix. The confusion matrix shows the number of records of each class have been correctly classified (true positives and true negatives) and also the number of records that have been wrongly classified (false positives and false negatives) in the format of a two-dimensional matrix. The evaluation requires a data scientist to oversee the process of collating the results, calculating the metrics, and presenting the final output as a confusion matrix. From the confusion matrix itself, all the familiar metrics that businesses use are calculated, such as "accuracy" (percent of correct classifications), "precision" (the ratio of correct positive predictions to the total predicted positives), "recall" (ratio of correct positive predictions to the total positives examples), "F1" (a measure of a test's accuracy), "ROC curves" (a plot of the True Positive Rate against the False Positive Rate), among others. For an example of a confusion matrix, please refer to FIG. 2 below.

The problem with a confusion matrix approach is that performance is shown in a tabular format that is not intuitive to non-data scientists; it does not explain what the numbers of the diagonal mean. This cognitive burden plagues the majority of ML and AI projects, and results in a bottleneck where too few data scientists are available to scale the solution effectively. Further, there is no linkage between the confusion matrix table and the underlying data that causes the problem/misclassifications. Typically, a data scientist can manually write a script that filters the results down to the data items that cause each mistake of interest (number off of the diagonal of the confusion matrix), but this is tedious and error prone. At best, a tool can automate the extraction, but this still leaves a user with a raw data set (e.g., a comma-separated values (CSV) file, etc.) of data, and no insight as to why the mistakes occurred.

The current analysis tools stop, however, at displaying the confusion matrix. The present invention adds a drill-down capability, allowing a user to dig down into the details of the data behind the confusion matrix. The present invention improves the explainability of a machine learning model evaluation. In order to train and evaluate a machine learning model, a labeled data set is divided into a training set, a test set and a validation or holdout set. The model is trained by using the training set and then evaluated by applying the model to the test and validation data sets, data sets that have not been seen or used to train the model previously. The reason for this is a model can over fit on the training data, where it learns highly specific and specialized patterns that have been presented within the training set. When the model is applied to unseen data, these specialized patterns are not found and therefore the model does not falsely classify them. Ideally the model will generalize the patterns it learns to enable it to handle any unseen data. There is always a trade-off between specializing and generalizing, and this is part of the model training exercise.

The present invention is a method for directly linking the misclassifications in the confusion matrix cells with the data that was affected, as well as explainability metrics that unpack the reasons the data falls in that cell. The user can immediately see why the data was misclassified. For example, for a visual recognition model that can detect ten types of animals, the user can easily identify those cases where the model mistakenly classified a cat as another animal like a dog. In addition, for each individual data item in this subset, the system will show an explanation of why the image was incorrectly classified.

FIG. 1 is a functional block diagram illustrating a distributed data processing environment, generally designated 100, suitable for operation of explanatory program 112 in accordance with at least one embodiment of the present invention. The term "distributed" as used herein describes a computer system that includes multiple, physically distinct devices that operate together as a single computer system. FIG. 1 provides only an illustration of one implementation and does not imply any limitations with regard to the environments in which different embodiments may be implemented. Many modifications to the depicted environment may be made by those skilled in the art without departing from the scope of the invention as recited by the claims.

Distributed data processing environment 100 includes computing device 110 connected to network 120. Network 120 can be, for example, a telecommunications network, a local area network (LAN), a wide area network (WAN), such as the Internet, or a combination of the three, and can include wired, wireless, or fiber optic connections. Network 120 can include one or more wired and/or wireless networks that are capable of receiving and transmitting data, voice, and/or video signals, including multimedia signals that include voice, data, and video information. In general, network 120 can be any combination of connections and protocols that will support communications between computing device 110 and other computing devices (not shown) within distributed data processing environment 100.

Computing device 110 can be a standalone computing device, a management server, a web server, a mobile computing device, or any other electronic device or computing system capable of receiving, sending, and processing data. In an embodiment, computing device 110 can be a laptop computer, a tablet computer, a netbook computer, a personal computer (PC), a desktop computer, a personal digital assistant (PDA), a smart phone, or any programmable electronic device capable of communicating with other computing devices (not shown) within distributed data processing environment 100 via network 120. In another embodiment, computing device 110 can represent a server computing system utilizing multiple computers as a server system, such as in a cloud computing environment. In yet another embodiment, computing device 110 represents a computing system utilizing clustered computers and components (e.g., database server computers, application server computers) that act as a single pool of seamless resources when accessed within distributed data processing environment 100.

In an embodiment, computing device 110 includes explanatory program 112. In an embodiment, explanatory program 112 is a program, application, or subprogram of a larger program for creating explanatory confusion matrices for machine learning. In an alternative embodiment, explanatory program 112 may be located on any other device accessible by computing device 110 via network 120.

In an embodiment, computing device 110 includes information repository 114. In an embodiment, information repository 114 may be managed by explanatory program 112. In an alternate embodiment, information repository 114 may be managed by the operating system of the device, alone, or together with, explanatory program 112. Information repository 114 is a data repository that can store, gather, compare, and/or combine information. In some embodiments, information repository 114 is located externally to computing device 110 and accessed through a communication network, such as network 120. In some embodiments, information repository 114 is stored on computing device 110. In some embodiments, information repository 114 may reside on another computing device (not shown), provided that information repository 114 is accessible by computing device 110. Information repository 114 includes, but is not limited to, ML model data, ML input/output data, confusion matrix data, learning data, user data, system configuration data, and other data that is received by explanatory program 112 from one or more sources, and data that is created by explanatory program 112.

Information repository 114 may be implemented using any volatile or non-volatile storage media for storing information, as known in the art. For example, information repository 114 may be implemented with a tape library, optical library, one or more independent hard disk drives, multiple hard disk drives in a redundant array of independent disks (RAID), solid-state drives (SSD), or random-access memory (RAM). Similarly, the information repository 114 may be implemented with any suitable storage architecture known in the art, such as a relational database, an object-oriented database, or one or more tables.

Distributed data processing environment 100 includes user interface (UI) 116. A user interface is the means by which the user and a computer system interact, in particular the use of displays, input devices, and software. UI 116 can be, for example, a Graphical User Interface (GUI). In an embodiment, UI 116 is a web browser-based GUI. In an embodiment, a user views the results of the explanatory program by interaction with UI 116.

In an embodiment, explanatory program 112 provides interactive UI 116 to explore the model evaluation on the test or validation dataset. In an embodiment, the user is able to click on a cell within the confusion matrix, and explanatory program 112 provides drill down functionality and displays all data records associated with this cell. For certain kinds of data analysis this will immediately indicate to the user to where the problem lies. An example of UI 116 is described in FIG. 3b below.

FIG. 2 depicts an example of a standard confusion matrix showing how a character recognition model is performing, in accordance with an embodiment of the present invention. A confusion matrix is an N×N matrix used for evaluating the performance of a classification model, where N is the number of target classes. The matrix compares the actual target values with those predicted by the machine learning model. The diagonal, from the top left value to the bottom right value, are the cases where the machine learning model predicted the correct answer. In the example illustrated in FIG. 2, these values are highlighted. Any values not on the diagonal represent cases where the machine learning model predicted an incorrect answer. In the example of FIG. 2, there are ten classes, the handwritten characters '0' through '9'. The rows represent the Actual Labels and the columns represent the Predicted Labels, i.e., the labels predicted by the machine leaning model. The correct predictions, as illustrated by the confusion matrix, are when the predicted label matched the actual label. The number in each box, in this example, represent the number of predictions that the model generated for that particular combination per 1,000 predictions. For example, in the first box at the top left, for every 1,000 cases where the correct answer was '0', the model predicted '0' in 997 cases. The model predicted '2', '4', and '5' once each. For the example in FIG. 2, the biggest area of confusion is between the character '3' and the character '8'. In the example of FIG. 2, for every 1,000 samples of the handwritten character '8', there are 23 incorrect predictions of the character '3'.

FIG. 3a depicts an example of a standard confusion matrix, as would be displayed by the current art, in accordance with an embodiment of the present invention.

Figure 3B:
FIG. 3b is an example of a standard confusion matrix, as would be displayed by the present invention, in accordance with an embodiment of the present invention.

FIG. 3b depicts an example of a confusion matrix, as would be displayed by an embodiment of the present invention. In the example illustrated in FIG. 3b, the same basic confusion matrix is shown as in FIG. 3a, although some of the values are different. In this example, the user has selected a value in the confusion matrix, i.e., cell 302, which is Negative-Positive, with a value of 4.3. The cell selected in this example is the case where the actual value was negative, but the model predicted positive, with an occurrence of 4.3% exhibiting the error. The explanation of the selected cell is shown by drilling down into the data behind the cell. When the user selects any value in the confusion matrix, the explanatory program displays the underlying data that led to this value in the confusion matrix. This is shown in the example as explanation 304.

Figure 4:
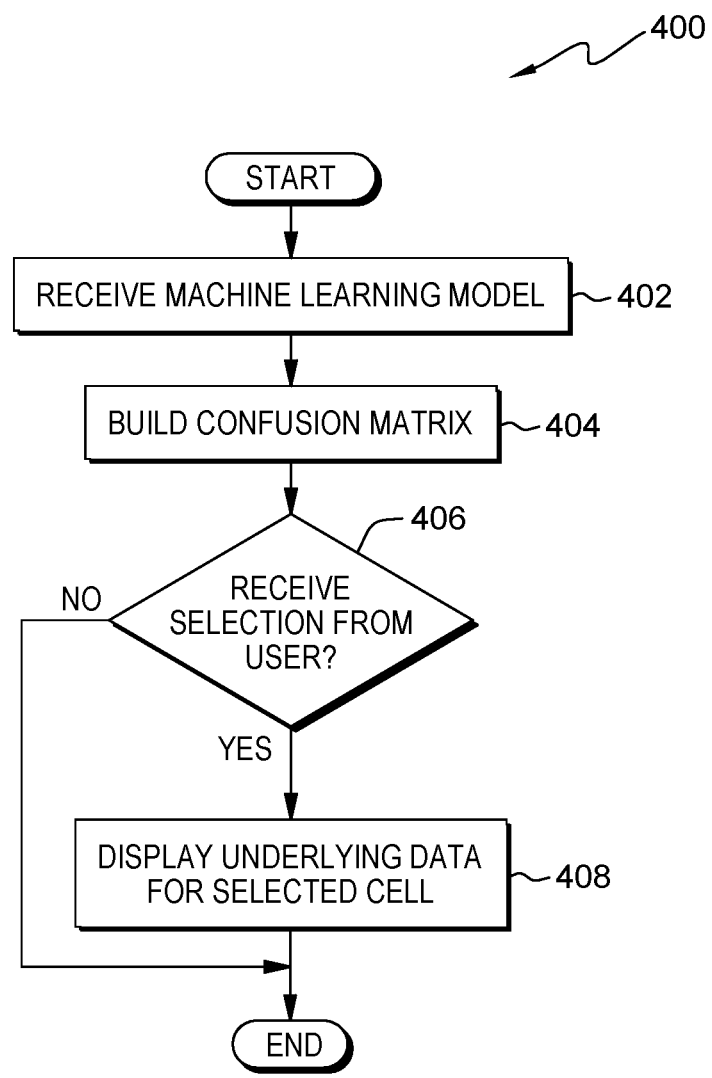
FIG. 4 is a flowchart depicting operational steps of the explanatory program, on a computing device within the distributed data processing environment of FIG. 1, for creating explanatory confusion matrices for machine learning, in accordance with an embodiment of the present invention.

FIG. 4 is a flowchart for the steps for the explanatory program, for creating explanatory confusion matrices for machine learning, in accordance with an embodiment of the present invention. In an alternative embodiment, the steps of workflow 400 may be performed by any other program while working with explanatory program 112. In an embodiment, explanatory program 112 receives the machine learning model to be evaluated, which has previously been trained using a training set of data. In an embodiment, explanatory program 112 builds a confusion matrix based on the test or validation data set received in the previous step. In an embodiment, explanatory program 112 determines if the user made a selection. In an embodiment, if explanatory program 112 determines that the user has made a selection, then explanatory program 112 follows the link to retrieve the underlying data for the selected cell and displays the data on the screen of a UI.

It should be appreciated that embodiments of the present invention provide at least for creating explanatory confusion matrices for machine learning. However, FIG. 4 provides only an illustration of one implementation and does not imply any limitations with regard to the environments in which different embodiments may be implemented. Many modifications to the depicted environment may be made by those skilled in the art without departing from the scope of the invention as recited by the claims.

Explanatory program 112 receives a machine learning model (step 402). In an embodiment, explanatory program 112 receives the machine learning model to be evaluated, which has previously been trained using a training set of data. In an embodiment, explanatory program 112 also receives a test dataset or a validation dataset with expected outcome values with which to build the confusion matrix. In an embodiment, the data set is divided into train, test, and validate, where the test and validate have not been used or seen by the model as part of the model training. In an embodiment, all data must be labeled with the expected outcome values.

Explanatory program 112 builds a confusion matrix (step 404). In an embodiment, explanatory program 112 builds a confusion matrix based on the test or validation data set received in step 402. In an embodiment, for each cell in the confusion matrix, explanatory program 112 creates links to the underlying data that produced the results in that cell. In an embodiment, explanatory program 112 creates a database with a record for each cell. In another embodiment, explanatory program 112 simply creates links into the corpus of the dataset used to create the confusion matrix.

In many cases, the reasons for model misclassification is often complex. In an embodiment, to help give insight into more complex cases, explanatory program 112 runs a series of tests to attempt to provide a reason why there has been a misclassification and a recommendation on how this could be resolved. In an embodiment, for each data record connected to the cell in the confusion matrix, explanatory program 112 will attempt to determine if it is a boundary misclassification, a new pattern absent from training set, bias in the data, or if the data point is an anomaly. In an embodiment, if explanatory program 112 determines that the misclassification is a boundary misclassification, then explanatory program 112 uses known techniques, e.g., principal component analysis, to explore feature importance and whether minor adjustments to dominant features would lead to a new classification. If adjustments to dominant features would lead to a new classification, then the misclassification likely occurs on a decision boundary.

In an embodiment, if explanatory program 112 determines that the misclassification occurs within a minority class, one reason for this misclassification could be that the machine learning model has favored the dominant class. This would be an example of bias in the data.

In an embodiment, explanatory program 112, based on the reason found above, will provide a number of recommendations on how the model accuracy could be improved. In various embodiments, these recommendations include the fine tuning of model hyperparameters; to use a different kind of model; to add more data examples; to perform a bias mitigation technique; or to apply some other well-established data science technique.

Explanatory program 112 determines if a selection was received from a user (decision block 406). In an embodiment, explanatory program 112 determines if the user made a selection. In an embodiment, the user selects a cell in the confusion matrix by clicking on a cell in the UI, as shown in the example in FIG. 3b. In an embodiment, if explanatory program 112 determines that the user has not made a selection ("no" branch, decision block 406), then explanatory program 112 ends for this cycle. In another embodiment, if explanatory program 112 determines that the user has not made a selection ("no" branch, decision block 406), then explanatory program 112 stays in decision block 406 until the user makes a selection.

Explanatory program 112 displays the underlying data for the selected cell (step 408). In an embodiment, if explanatory program 112 determines that the user has made a selection ("yes" branch, decision block 406), then explanatory program 112 follows the link created in step 404 to retrieve the underlying data for the selected cell and displays a representation of the data on the screen of a UI. In an embodiment, explanatory program 112 displays the UI using any method as described above in FIG. 3b. In an embodiment, explanatory program 112 exports the representation of the data to the user. In an embodiment, explanatory program 112 exports the representation of the data to the user as a CSV file. In another embodiment, explanatory program 112 exports the representation of the data to the user as a graphical representation of the screen display of UI 116. In yet another embodiment, explanatory program 112 exports the representation of the data to the user in any format as would be known to one skilled in the art. Explanatory program 112 then ends for this cycle.

In an embodiment, explanatory program 112 applies any known explanation model plugin application (e.g., LIME or SHAP) to each selected cell to allow the user to physically visualize why the data is incorrectly classified. In an embodiment, explanatory program 112 receives input from the user that contains corrections to the predictions for specific cells of the confusion matrix. In an embodiment, explanatory program 112 applies these corrections to the machine learning model to improve future predictions.

Figure 5:
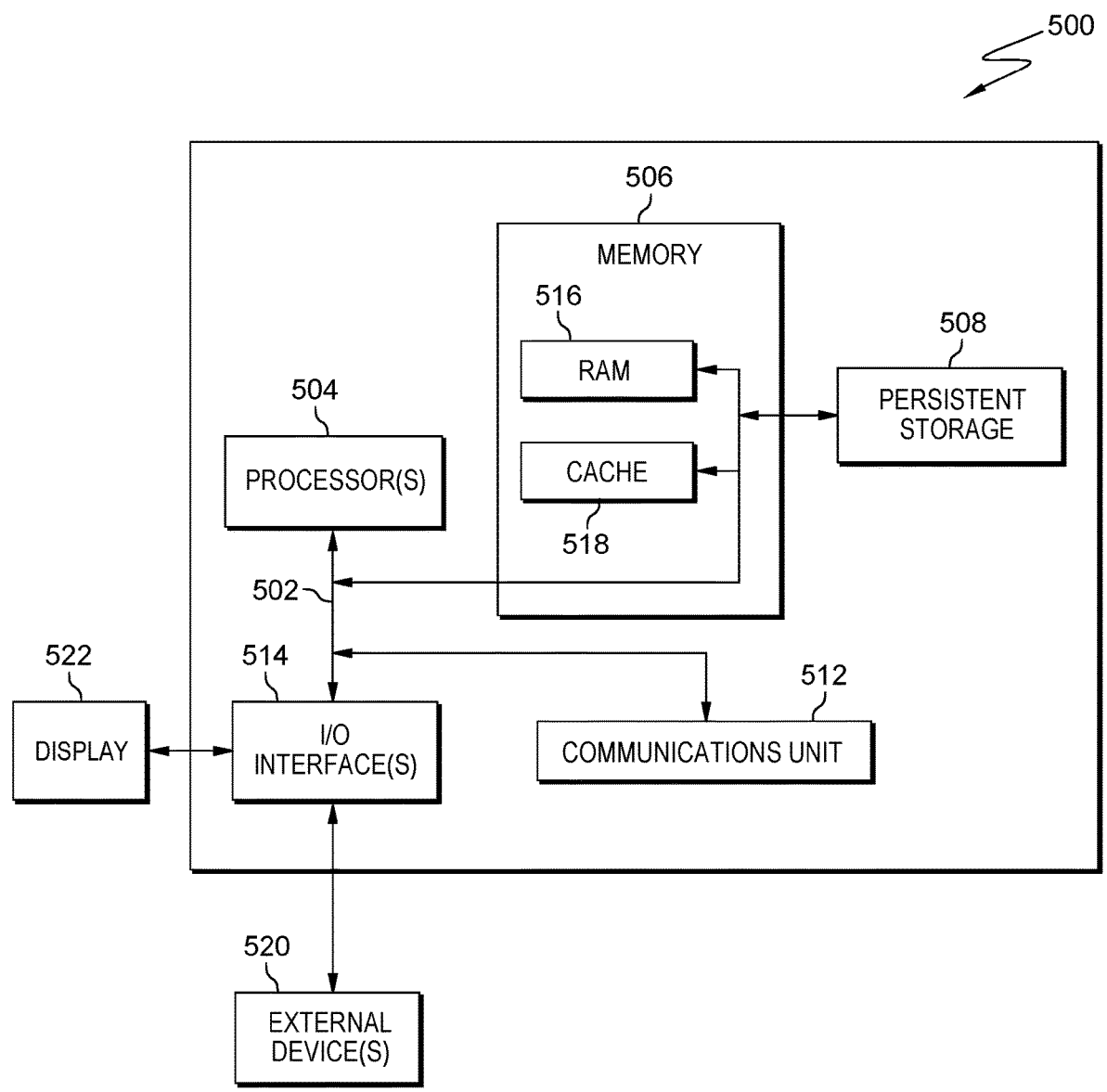
FIG. 5 depicts a block diagram of components of the computing devices executing the explanatory program within the distributed data processing environment of FIG. 1, in accordance with an embodiment of the present invention.

FIG. 5 is a block diagram depicting components of computing device 110 suitable for explanatory program 112, in accordance with at least one embodiment of the invention. FIG. 5 displays computer 500; one or more processor(s) 504 (including one or more computer processors); communications fabric 502; memory 506, including random-access memory (RAM) 516 and cache 518; persistent storage 508; communications unit 512; I/O interfaces 514; display 522; and external devices 520. It should be appreciated that FIG. 5 provides only an illustration of one embodiment and does not imply any limitations with regard to the environments in which different embodiments may be implemented. Many modifications to the depicted environment may be made.

As depicted, the computer 500 operates over the communications fabric 502, which provides communications between the computer processor(s) 504, memory 506, persistent storage 508, communications unit 512, and I/O interface(s) 514. Communications fabric 502 may be implemented with any architecture suitable for passing data or control information between processors 504 (e.g., microprocessors, communications processors, and network processors), memory 506, external devices 520, and any other hardware components within a system. For example, communications fabric 502 may be implemented with one or more buses.

Memory 506 and persistent storage 508 are computer readable storage media. In the depicted embodiment, memory 506 comprises RAM 516 and cache 518. In general, memory 506 can include any suitable volatile or non-volatile computer readable storage media. Cache 518 is a fast memory that enhances the performance of processor(s) 504 by holding recently accessed data, and near recently accessed data, from RAM 516.

Program instructions for explanatory program 112 may be stored in the persistent storage 508, or more generally, any computer readable storage media, for execution by one or more of the respective computer processors 504 via one or more memories of memory 506. Persistent storage 508 may be a magnetic hard disk drive, a solid-state disk drive, a semiconductor storage device, read only memory (ROM), electronically erasable programmable read-only memory (EEPROM), flash memory, or any other computer readable storage media that is capable of storing program instruction or digital information.

The media used by persistent storage 508 may also be removable. For example, a removable hard drive may be used for persistent storage 508. Other examples include optical and magnetic disks, thumb drives, and smart cards that are inserted into a drive for transfer onto another computer readable storage medium that is also part of persistent storage 508.

Communications unit 512, in these examples, provides for communications with other data processing systems or devices. In these examples, communications unit 512 includes one or more network interface cards. Communications unit 512 may provide communications through the use of either or both physical and wireless communications links. In the context of some embodiments of the present invention, the source of the various input data may be physically remote to the computer 500 such that the input data may be received, and the output similarly transmitted via communications unit 512.

I/O interface(s) 514 allows for input and output of data with other devices that may be connected to computer 500. For example, I/O interface(s) 514 may provide a connection to external device(s) 520 such as a keyboard, a keypad, a touch screen, a microphone, a digital camera, and/or some other suitable input device. External device(s) 520 can also include portable computer readable storage media such as, for example, thumb drives, portable optical or magnetic disks, and memory cards. Software and data used to practice embodiments of the present invention, e.g., explanatory program 112, can be stored on such portable computer readable storage media and can be loaded onto persistent storage 508 via I/O interface(s) 514. I/O interface(s) 514 also connect to a display 522.

Display 522 provides a mechanism to display data to a user and may be, for example, a computer monitor. Display 522 can also function as a touchscreen, such as a display of a tablet computer.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The present invention may be a system, a method, and/or a computer program product. The computer program product may include a computer readable storage medium (or media) having computer readable program instructions thereon for causing a processor to carry out aspects of the present invention.

The computer readable storage medium can be any tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general-purpose computer, a special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, a segment, or a portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

What is claimed is:

1. A computer implemented method for creating explanatory confusion matrices, comprising:
building, by one or more computer processors with access to classification results from a machine learning model, a user interface including a confusion matrix having a plurality of cells for visualizing the classification results, wherein the plurality of cells includes respective electronic links to a corresponding set of data that produced the classification results visualized in the plurality of cells, and wherein each cell of the plurality of cells that is associated with a respective incorrect classification by the machine learning model is selectable to execute an explanatory application that is configured to identify at least one data-specific reason that each misclassified data resulting in the respective incorrect classification is incorrectly classified and at least one recommendation to correct the machine learning model;
executing, based on a user manipulation of the user interface to select a specific cell in the confusion matrix that is associated with the respective incorrect classification by the machine learning model, the explanatory application to identify the at least one data-specific reason that each misclassified data resulting in the respective incorrect classification is incorrectly classified and the at least one recommendation to correct the machine learning model;
visualizing, by the one or more computer processors on the user interface, the at least one data-specific reason that each misclassified data associated with the specific cell is incorrectly classified and the at least one recommendation to correct the machine learning model;
causing, based on the user manipulation of the user interface to correct the respective incorrect classification associated with the specific cell based on the at least one recommendation displayed on the user interface, at least one correction to each misclassified data associated with the specific cell; and
responsive to the user manipulation of the user interface to correct each misclassified data associated with the specific cell, generating, by the one or more computer processors, correctly classified data and retraining, by the one or more computer processors, the machine learning model with the correctly classified data to adjust at least one feature of the machine learning model such that the machine learning model retrained to include the at least one adjusted feature correctly classifies each misclassified data associated with the specific cell and improves future predictions on unseen data.

2. The computer implemented method of claim 1, wherein the visualizing the at least one data-specific reason that each misclassified data associated with the specific cell is incorrectly classified and the at least one recommendation to correct the machine learning model further comprises:
displaying, by the one or more computer processors, one or more explainability metrics of the specific cell of the plurality of cells that was misclassified.

3. The computer implemented method of claim 1, wherein the visualizing the at least one data-specific reason that each misclassified data associated with the specific cell is incorrectly classified and the at least one recommendation to correct the machine learning model further comprises:
exporting, by the one or more computer processors, the corresponding set of data as a graphical representation on the user interface.

4. A computer program product for creating explanatory confusion matrices, comprising:
one or more computer readable storage media; and program instructions stored on the one or more computer readable storage media to perform operations comprising:
building, based on classification results from a machine learning model, a user interface including a confusion matrix having a plurality of cells for visualizing the classification results, wherein the plurality of cells includes respective electronic links to a corresponding set of data that produced the classification results visualized in the plurality of cells, and wherein each cell of the plurality of cells that is associated with a respective incorrect classification by the machine learning model is selectable to execute an explanatory application that is configured to identify at least one data-specific reason that each misclassified data resulting in the respective incorrect classification is incorrectly classified and at least one recommendation to correct the machine learning model;
executing, based on a user manipulation of the user interface to select a specific cell in the confusion matrix that is associated with the respective incorrect classification by the machine learning model, the explanatory application to identify the at least one data-specific reason that each misclassified data resulting in the respective incorrect classification is incorrectly classified and the at least one recommendation to correct the machine learning model;
visualizing, on the user interface, the at least one data-specific reason that each misclassified data associated with the specific cell is incorrectly classified and the at least one recommendation to correct the machine learning model;
causing, based on the user manipulation of the user interface to correct the respective incorrect classification associated with the specific cell based on the at least one recommendation displayed on the user interface, at least one correction to each misclassified data associated with the specific cell; and
responsive to the user manipulation of the user interface to correct each misclassified data associated with the specific cell, generating correctly classified data and retraining the machine learning model with the correctly classified data to adjust at least one feature of the machine learning model such that the machine learning model retrained to include the at least one adjusted feature correctly classifies each misclassified data associated with the specific cell and improves future predictions on unseen data.

5. The computer program product of claim 4, wherein the visualizing, on the user interface, the at least one data-specific reason that each misclassified data associated with the specific cell is incorrectly classified and the at least one recommendation to correct the machine learning model further comprises:
displaying one or more explainability metrics of the specific cell of the plurality of cells that was misclassified.

6. The computer program product of claim 4, wherein the visualizing, on the user interface, the at least one data-specific reason that each misclassified data associated with the specific cell is incorrectly classified and the at least one recommendation to correct the machine learning model further comprises:
exporting the corresponding set of data as a graphical representation on the user interface.

7. A computer system for creating explanatory confusion matrices, the computer system comprising:
a processor set;
one or more computer readable storage media; and
program instructions stored on the one or more computer readable storage media to cause the processor set to perform operations comprising:
building, by the processor set with access to classification results from a machine learning model, a user interface including a confusion matrix having a plurality of cells for visualizing the classification results, wherein the plurality of cells includes respective electronic links to a corresponding set of data that produced the classification results visualized in the plurality of cells, and wherein each cell of the plurality of cells that is associated with a respective incorrect classification by the machine learning model is selectable to execute an explanatory application that is configured to identify at least one data-specific reason that each misclassified data resulting in the respective incorrect classification is incorrectly classified and at least one recommendation to correct the machine learning model;
executing, based on a user manipulation of the user interface to select a specific cell in the confusion matrix that is associated with the respective incorrect classification by the machine learning model, the explanatory application to identify the at least one data-specific reason that each misclassified data resulting in the respective incorrect classification is incorrectly classified and the at least one recommendation to correct the machine learning model;

visualizing, on the user interface, the at least one data-specific reason that each misclassified data associated with the specific cell is incorrectly classified and the at least one recommendation to correct the machine learning model;

causing, based on the user manipulation of the user interface to correct the respective incorrect classification associated with the specific cell based on the at least one recommendation displayed on the user interface, at least one correction to each misclassified data associated with the specific cell; and responsive to the user manipulation of the user interface to correct each misclassified data associated with the specific cell, generating correctly classified data and retraining the machine learning model with the correctly classified data to adjust at least one feature of the machine learning model such that the machine learning model retrained to include the at least one adjusted feature correctly classifies each misclassified data associated with the specific cell and improves future predictions on unseen data.

8. The computer system of claim 7, wherein the visualizing, on the user interface, the at least one data-specific reason that each misclassified data associated with the specific cell is incorrectly classified and the at least one recommendation to correct the machine learning model further comprises:

displaying one or more explainability metrics of the specific cell of the plurality of cells that was misclassified.

9. The computer implemented method of claim 1, further comprising: generating a database including a record for the each cell of the plurality of cells, wherein the record includes the corresponding set of data accessible by the respective electronic links from the plurality of cells.

* * * * *